(12) United States Patent
Phillips (10) Patent No.: US 10,713,501 B2
(45) Date of Patent: Jul. 14, 2020

(54) FOCUS SYSTEM TO ENHANCE VEHICLE VISION PERFORMANCE

(71) Applicant: Ford Global Technologies, LLC, Dearborn, MI (US)

(72) Inventor: Anthony Mark Phillips, Northville, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 469 days.

(21) Appl. No.: 14/825,558

(22) Filed: Aug. 13, 2015

(65) Prior Publication Data
US 2017/0046578 A1    Feb. 16, 2017

(51) Int. Cl.
| | | |
|---|---|---|
| *G06K 9/00* | (2006.01) | |
| *H04N 5/232* | (2006.01) | |
| *H04N 5/247* | (2006.01) | |
| *G02B 27/01* | (2006.01) | |
| *G06T 11/60* | (2006.01) | |

(52) U.S. Cl.
CPC ......... *G06K 9/00791* (2013.01); *G02B 27/01* (2013.01); *G02B 27/0101* (2013.01); *G02B 27/0179* (2013.01); *G06T 11/60* (2013.01); *H04N 5/23229* (2013.01); *H04N 5/23293* (2013.01); *H04N 5/247* (2013.01); *G02B 2027/014* (2013.01); *G02B 2027/0118* (2013.01); *G02B 2027/0127* (2013.01); *G02B 2027/0129* (2013.01); *G02B 2027/0138* (2013.01); *G02B 2027/0187* (2013.01)

(58) Field of Classification Search
CPC ................ G06K 9/00791; G02B 27/01; G02B 27/0101; G02B 27/0179; G02B 2027/014; G02B 2027/0118; G02B 2027/0138; G02B 2027/0129; G06T 11/00; H04N 5/23293; H04N 5/247; H04N 5/23229; G06F 3/013
See application file for complete search history.

(56) References Cited

U.S. PATENT DOCUMENTS

| | | | |
|---|---|---|---|
| 6,397,137 B1 | 5/2002 | Alpert et al. | |
| 6,456,262 B1* | 9/2002 | Bell | A61B 3/113 345/472 |
| 7,065,250 B1* | 6/2006 | Lennon | G06K 9/469 382/224 |
| 7,719,520 B2 | 5/2010 | Singh et al. | |
| 8,174,375 B2 | 5/2012 | Fong et al. | |
| 8,292,433 B2 | 10/2012 | Vertegaal | |
| 2006/0125919 A1* | 6/2006 | Camilleri | B60R 1/00 348/148 |
| 2006/0158730 A1* | 7/2006 | Kira | H04N 13/133 359/462 |
| 2008/0077882 A1* | 3/2008 | Kramer | B60K 35/00 715/810 |
| 2011/0037877 A1* | 2/2011 | Tamaru | H04N 5/23229 348/239 |

(Continued)

*Primary Examiner* — Joseph Suh
(74) *Attorney, Agent, or Firm* — Frank Lollo; Brooks Kushman P.C.

(57) ABSTRACT

A vehicle includes an interface that displays an image of objects in a vicinity of the vehicle, and a controller that alters a depth of field of the image based on a focal point associated with a direction of driver eye gaze relative to the image to alter blurriness of the image away from the focal point.

12 Claims, 7 Drawing Sheets

(56) References Cited

U.S. PATENT DOCUMENTS

| | | | | |
|---|---|---|---|---|
| 2011/0063099 A1* | 3/2011 | Miller | G07C 5/085 | 340/439 |
| 2011/0285897 A1* | 11/2011 | Fujii | G03B 7/093 | 348/345 |
| 2012/0027393 A1* | 2/2012 | Tsuda | H04N 5/23212 | 396/102 |
| 2012/0082381 A1* | 4/2012 | Maki | G06K 9/00369 | 382/170 |
| 2012/0093358 A1* | 4/2012 | Tschirhart | B60R 1/00 | 382/103 |
| 2012/0218412 A1* | 8/2012 | Dellantoni | G01C 21/3602 | 348/148 |
| 2012/0276177 A1* | 11/2012 | Hilliard, Jr. | A61K 8/0245 | 424/401 |
| 2013/0169754 A1* | 7/2013 | Aronsson | H04N 5/23212 | 348/46 |
| 2013/0215105 A1* | 8/2013 | Yonezu | G06T 15/10 | 345/419 |
| 2014/0222995 A1* | 8/2014 | Razden | G09B 7/02 | 709/224 |
| 2014/0364228 A1* | 12/2014 | Rimon | A63F 13/12 | 463/32 |
| 2015/0035685 A1* | 2/2015 | Strickland | B60Q 9/008 | 340/901 |
| 2015/0055010 A1* | 2/2015 | Eguchi | G03B 13/36 | 348/349 |
| 2015/0055808 A1* | 2/2015 | Vennstrom | G06F 3/167 | 381/307 |
| 2015/0358563 A1* | 12/2015 | Watanabe | H04N 5/23245 | 348/296 |
| 2016/0026243 A1* | 1/2016 | Bertram | G16H 30/20 | 345/156 |
| 2016/0094705 A1* | 3/2016 | Vendrow | G06K 9/0061 | 382/103 |
| 2016/0213316 A1* | 7/2016 | Hyde | A61B 5/4875 | |
| 2016/0227184 A1* | 8/2016 | Nims | B41M 3/06 | |
| 2018/0031848 A1* | 2/2018 | Huang | G02B 27/017 | |

* cited by examiner

FOCUS SYSTEM TO ENHANCE VEHICLE VISION PERFORMANCE

TECHNICAL FIELD

This application is generally related to a vision system in a vehicle configured to selectively adjust a field of focus to enhance objects within a field of view.

BACKGROUND

Drivers of vehicles have an increasing amount of information to observe and process to maneuver safely while driving on the open road. Drivers must not only know about and adhere to the rules of the road in their own right, but they must also be aware of what nearby vehicles and pedestrians are doing. Weather conditions around the vehicle such as snow, rain, and fog impact visibility and may impact operation of some vehicle systems. Vision systems are typically designed having a large depth of field such that many objects in the field of view appear in focus in the image.

SUMMARY

A vehicle includes an interface configured to display an image of objects in a vicinity of the vehicle, and at least one controller that is programmed to alter a depth of field of the image based on a focal point associated with a direction of driver eye gaze relative to the image to alter blurriness of the image away from the focal point.

A method of enhancing a digital image in a vehicle includes identifying a focal point on a display screen associated with a gaze of a driver at an image, and altering a depth of field associated with the image based on a distance between the vehicle and a physical location of an object represented by the image at the focal point to blur other objects in the image away from the focal point.

A vehicle includes a camera having an aperture and configured to output a signal indicative of a field of view, a display configured to convert the signal to an image, and a driver camera assembly configured to output a focal point associated with a gaze of a driver relative to the display. The vehicle also includes at least one controller programmed to adjust a size of the aperture to alter a depth of field to blur objects outside of the depth of field around the focal point.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

This disclosure, among other things, proposes vision systems and methods for a vehicle to operate in which vision systems adjust the depth of field to blur objects outside of the focal point. For example, when driving on a roadway while snow is falling, the snow may draw the attention of a driver or of a vehicle vision system. When a vehicle vision system has a large depth of field, many objects appear clear in the image and those object may draw attention away from a focal point. By reducing the depth of field at the focal point, objects outside of the depth of field such as snow, rain, etc. blur. When the objects outside of the depth of field blur, an area near the edges of the objects outside the depth of field appear to have a semi-transparent aspect such that the image at the focal point tends to appear to stand out or look like it has been enhanced. This can also be illustrated by considering a driver driving a vehicle at night in a snow storm. If the driver turns on the headlights of the vehicle with a high beam setting, the snow near the front of the vehicle in the driver's view is illuminated and may hinder the view of the driver. When the driver reduces the headlights to a low beam setting, the snow near the front of the vehicle in the driver's view is no longer illuminated and appears semi-transparent such that a field of view of the driver may appear clearer. Here, the driver's depth of field changes based on the illumination of the snowflakes near the front of the vehicle.

Another aspect is that a human being has the ability to detect, distinguish, recognize, and characterize objects quickly. For example, modern pedestrian detection systems may be configured to detect walking individuals, however the pedestrian detection systems may have difficultly detecting a stroller, a child on a bicycle, scooter, skateboard, tricycle, or a person wearing certain clothes having certain patterns or a person standing still in certain still positions. The combination of vision systems that use an operator's eye gaze to control the depth of field may enhance the performance of these vision systems. The vision systems may include pedestrian detection systems, collision detection systems, adaptive cruise control systems, or other dynamic vehicle systems. The eye gaze of the driver or operator may be integrated with a heads up display (HUD) system, a vehicle infotainment system, a vehicle instrument cluster, a vehicle center console display, a driver information console, or a display screen coupled to a rear view or side view mirror. The systems may view objects proximate to the vehicle such as objects in front of the vehicle, to the sides of the vehicle or to the rear of the vehicle.

Figure 1A:
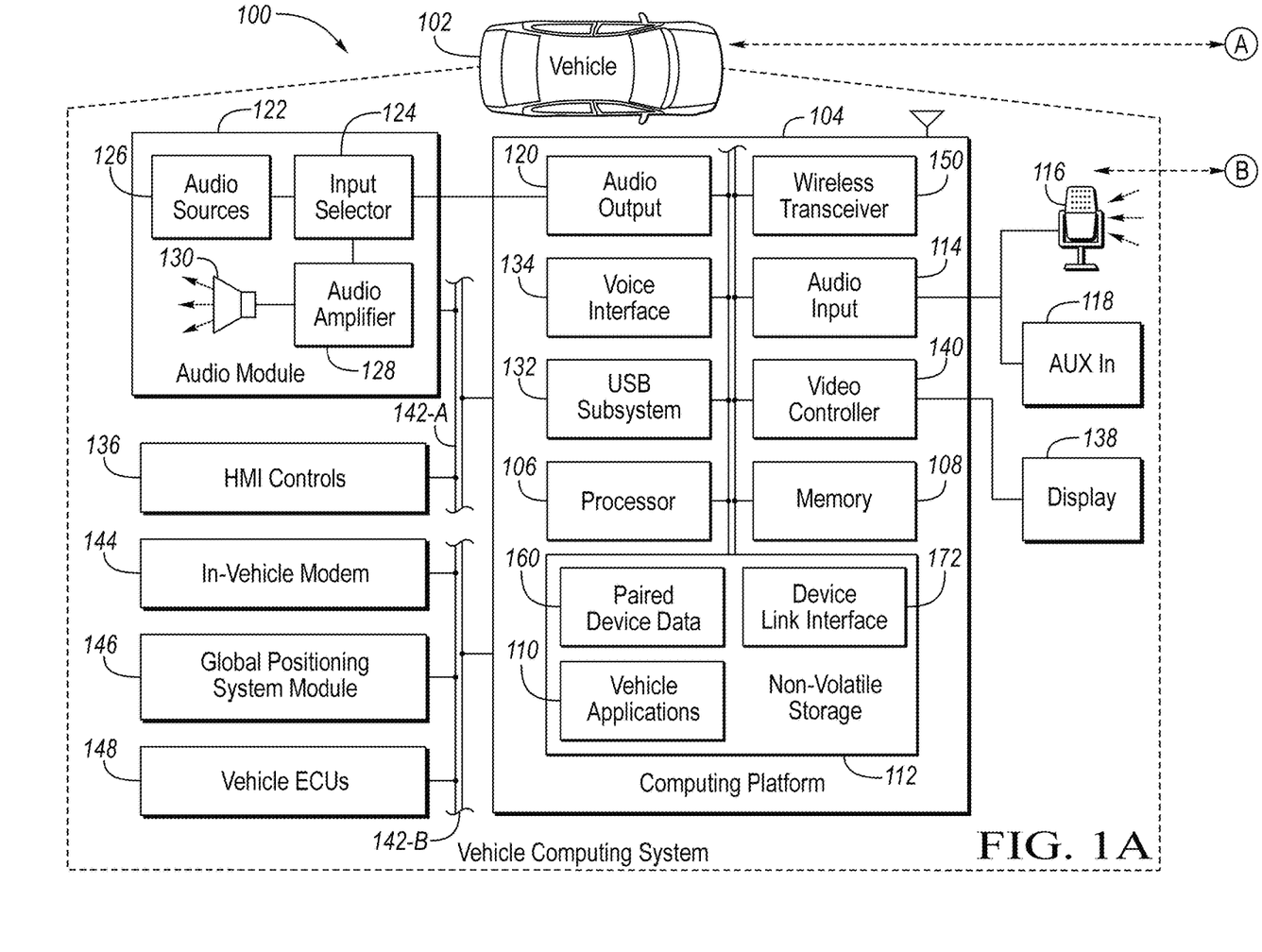
FIGS. 1A and 1B are an exemplary block topology of a vehicle infotainment system.
Figure 1B:
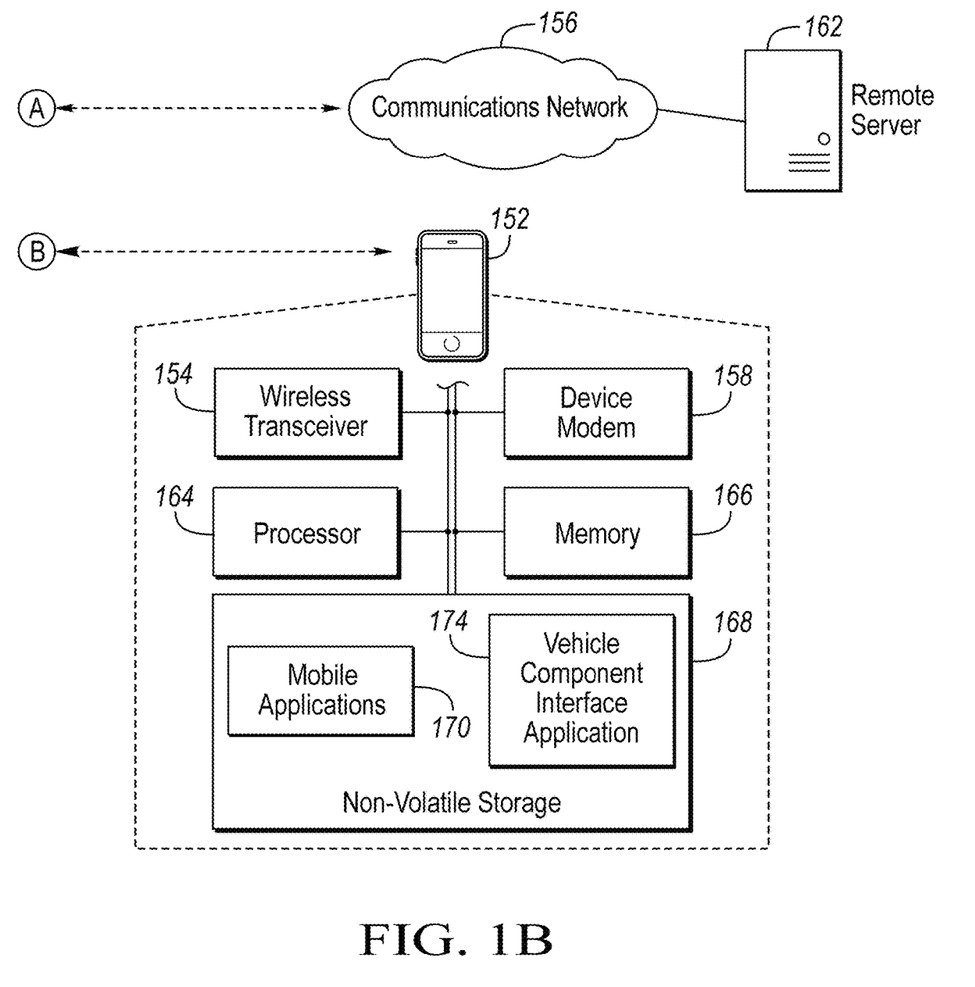

FIGS. 1A and 1B illustrate an example diagram of a system 100 that may be used to provide telematics services to a vehicle 102. The vehicle 102 may be one of various types of passenger vehicles, such as a crossover utility vehicle (CUV), a sport utility vehicle (SUV), a truck, a recreational vehicle (RV), a boat, a plane or other mobile machine for transporting people or goods. Telematics services may include, as some non-limiting possibilities, navigation, turn-by-turn directions, vehicle health reports, local business search, accident reporting, and hands-free calling. In an example, the system 100 may include the SYNC system manufactured by The Ford Motor Company of Dearborn, Mich. It should be noted that the illustrated system 100 is merely an example, and more, fewer, and/or differently located elements may be used.

The computing platform 104 may include one or more processors 106 configured to perform instructions, commands and other routines in support of the processes described herein. For instance, the computing platform 104 may be configured to execute instructions of vehicle applications 110 to provide features such as navigation, accident reporting, satellite radio decoding, and hands-free calling. Such instructions and other data may be maintained in a non-volatile manner using a variety of types of computer-readable storage medium 112. The computer-readable medium 112 (also referred to as a processor-readable medium or storage) includes any non-transitory medium (e.g., a tangible medium) that participates in providing instructions or other data that may be read by the processor 106 of the computing platform 104. The processor may also be multiple processors in multiple computing units which each perform a part of the overall driver alert. For example, one processor may perform audible alert functions, located in the audio module (122), while a different processor in the video controller (140) handles the visual alert, predicated from the same alert message. Computer-executable instructions may be compiled or interpreted from computer programs created using a variety of programming languages and/or technologies, including, without limitation and either alone or in combination, Java, C, C++, C#, Objective C, Fortran, Pascal, Java Script, Python, Perl, and PL/SQL.

The computing platform 104 may be provided with various features allowing the vehicle occupants to interface with the computing platform 104. For example, the computing platform 104 may include an audio input 114 configured to receive spoken commands from vehicle occupants through a connected microphone 116, and auxiliary audio input 118 configured to receive audio signals from connected devices. The auxiliary audio input 118 may be a physical connection, such as an electrical wire or a fiber optic cable, or a wireless input, such as a BLUETOOTH audio connection. In some examples, the audio input 114 may be configured to provide audio processing capabilities, such as pre-amplification of low-level signals, and conversion of analog inputs into digital data for processing by the processor 106.

The computing platform 104 may also provide one or more audio outputs 120 to an input of an audio module 122 having audio playback functionality. In other examples, the computing platform 104 may provide the audio output to an occupant through use of one or more dedicated speakers (not illustrated). The audio module 122 may include an input selector 124 configured to provide audio content from a selected audio source 126 to an audio amplifier 128 for playback through vehicle speakers 130 or headphones (not illustrated). The audio sources 126 may include, as some examples, decoded amplitude modulated (AM) or frequency modulated (FM) radio signals, and audio signals from compact disc (CD) or digital versatile disk (DVD) audio playback. The audio sources 126 may also include audio received from the computing platform 104, such as audio content generated by the computing platform 104, audio content decoded from flash memory drives connected to a universal serial bus (USB) subsystem 132 of the computing platform 104, and audio content passed through the computing platform 104 from the auxiliary audio input 118.

The computing platform 104 may utilize a voice interface 134 to provide a hands-free interface to the computing platform 104. The voice interface 134 may support speech recognition from audio received via the microphone 116 according to grammar associated with available commands, and voice prompt generation for output via the audio module 122. In some cases, the system may be configured to temporarily mute or otherwise override the audio source specified by the input selector 124 when an audio prompt is ready for presentation by the computing platform 104 and another audio source 126 is selected for playback.

The computing platform 104 may also receive input from human-machine interface (HMI) controls 136 configured to provide for occupant interaction with the vehicle 102. For instance, the computing platform 104 may interface with one or more buttons or other HMI controls configured to invoke functions on the computing platform 104 (e.g., steering wheel audio buttons, a push-to-talk button, instrument panel controls, etc.). The computing platform 104 may also drive or otherwise communicate with one or more displays 138 configured to provide visual output to vehicle occupants by way of a video controller 140. In some cases, the display 138 may be a touch screen further configured to receive user touch input via the video controller 140, while in other cases the display 138 may be a display only, without touch input capabilities.

The computing platform 104 may be further configured to communicate with other components of the vehicle 102 via one or more in-vehicle networks 142. The in-vehicle networks 142 may include one or more of a vehicle controller area network (CAN), an Ethernet network, and a media oriented system transfer (MOST), as some examples. The in-vehicle networks 142 may allow the computing platform 104 to communicate with other vehicle 102 systems, such as a vehicle modem 144 (which may not be present in some configurations), a global positioning system (GPS) module 146 configured to provide current vehicle 102 location and heading information, and various vehicle ECUs 148 configured to cooperate with the computing platform 104. As some non-limiting possibilities, the vehicle ECUs 148 may include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors and/or trunk of the vehicle 102); a radio transceiver module configured to communicate with key fobs or other local vehicle 102 devices; and a climate control management module configured to provide control and monitoring of heating and cooling system components (e.g., compressor clutch and blower fan control, temperature sensor information, etc.).

As shown, the audio module 122 and the HMI controls 136 may communicate with the computing platform 104 over a first in-vehicle network 142A, and the vehicle modem 144, GPS module 146, and vehicle ECUs 148 may communicate with the computing platform 104 over a second in-vehicle network 142B. In other examples, the computing platform 104 may be connected to more or fewer in-vehicle networks 142. Additionally or alternatively, one or more HMI controls 136 or other components may be connected to the computing platform 104 via different in-vehicle networks 142 than shown, or directly without connection to an in-vehicle network 142.

The computing platform 104 may also be configured to communicate with mobile devices 152 of the vehicle occupants. The mobile devices 152 may be any of various types of portable computing device, such as cellular phones, tablet computers, smart watches, laptop computers, portable music players, or other devices capable of communication with the computing platform 104. In many examples, the computing platform 104 may include a wireless transceiver 150 (e.g., a BLUETOOTH module, a ZIGBEE transceiver, a Wi-Fi transceiver, an IrDA transceiver, an RFID transceiver, etc.) configured to communicate with a compatible wireless transceiver 154 of the mobile device 152. The wireless modules may transmit data at a carrier frequency or a center frequency. The center frequency is an important aspect of a wireless system by impacting noise immunity and bandwidth. For example, typical remote keyless entry systems operate at 315 MHz in the United States, and 433 MHz in Europe, while WiFi and Bluetooth may operate at frequencies including frequencies over 2 GHz such as 2.4 GHz. Additionally or alternatively, the computing platform 104 may communicate with the mobile device 152 over a wired connection, such as via a USB connection between the mobile device 152 and the USB subsystem 132.

The communications network 156 may provide communications services, such as packet-switched network services (e.g., Internet access, VoIP communication services), to devices connected to the communications network 156. An example of a communications network 156 may include a cellular telephone network. Mobile devices 152 may provide network connectivity to the communications network 156 via a device modem 158 of the mobile device 152. To facilitate the communications over the communications network 156, mobile devices 152 may be associated with unique device identifiers (e.g., mobile device numbers (MDNs), Internet protocol (IP) addresses, etc.) to identify the communications of the mobile devices 152 over the communications network 156. In some cases, occupants of the vehicle 102 or devices having permission to connect to the computing platform 104 may be identified by the computing platform 104 according to paired device data 160 maintained in the storage medium 112. The paired device data 160 may indicate, for example, the unique device identifiers of mobile devices 152 previously paired with the computing platform 104 of the vehicle 102, such that the computing platform 104 may automatically reconnect to the mobile devices 152 referenced in the paired device data 160 without user intervention.

When a mobile device 152 that supports network connectivity is paired with the computing platform 104, the mobile device 152 may allow the computing platform 104 to use the network connectivity of the device modem 158 to communicate over the communications network 156 with the remote telematics services 162. In one example, the computing platform 104 may utilize a data-over-voice plan or data plan of the mobile device 152 to communicate information between the computing platform 104 and the communications network 156. Additionally or alternatively, the computing platform 104 may utilize the vehicle modem 144 to communicate information between the computing platform 104 and the communications network 156, without use of the communications facilities of the mobile device 152.

Similar to the computing platform 104, the mobile device 152 may include one or more processors 164 configured to execute instructions of mobile applications 170 loaded to a memory 166 of the mobile device 152 from storage medium 168 of the mobile device 152. In some examples, the mobile applications 170 may be configured to communicate with the computing platform 104 via the wireless transceiver 154 and with the remote telematics services 162 or other network services via the device modem 158. The computing platform 104 may also include a device link interface 172 to facilitate the integration of functionality of the mobile applications 170 into the grammar of commands available via the voice interface 134 as well as into display 138 of the computing platform 104. The device link interfaced 172 may also provide the mobile applications 170 with access to vehicle information available to the computing platform 104 via the in-vehicle networks 142. Some examples of device link interfaces 172 include the SYNC APPLINK component of the SYNC system provided by The Ford Motor Company of Dearborn, Mich., the CarPlay protocol provided by Apple Inc. of Cupertino, Calif., or the Android Auto protocol provided by Google, Inc. of Mountain View, Calif. The vehicle component interface application 174 may be once such application installed to the mobile device 152.

The vehicle component interface application 174 of the mobile device 152 may be configured to facilitate access to one or more vehicle 102 features made available for device configuration by the vehicle 102. In some cases, the available vehicle 102 features may be accessible by a single vehicle component interface application 174, in which case the vehicle component interface application 174 may be configured to be customizable or to maintain configurations supportive of the specific vehicle 102 brand/model and option packages. In an example, the vehicle component interface application 174 may be configured to receive, from the vehicle 102, a definition of the features that are available to be controlled, display a user interface descriptive of the available features, and provide user input from the user interface to the vehicle 102 to allow the user to control the indicated features. As exampled in detail below, an appropriate mobile device 152 to display the vehicle component interface application 174 may be identified, and a definition of the user interface to display may be provided to the identified vehicle component interface application 174 for display to the user.

Systems such as the system 100 may require mobile device 152 pairing with the computing platform 104 and/or other setup operations. However, as explained in detail below, a system may be configured to allow vehicle occupants to seamlessly interact with user interface elements in their vehicle or with any other framework-enabled vehicle, without requiring the mobile device 152 to have been paired with or be in communication with the computing platform 104.

Figure 2A:
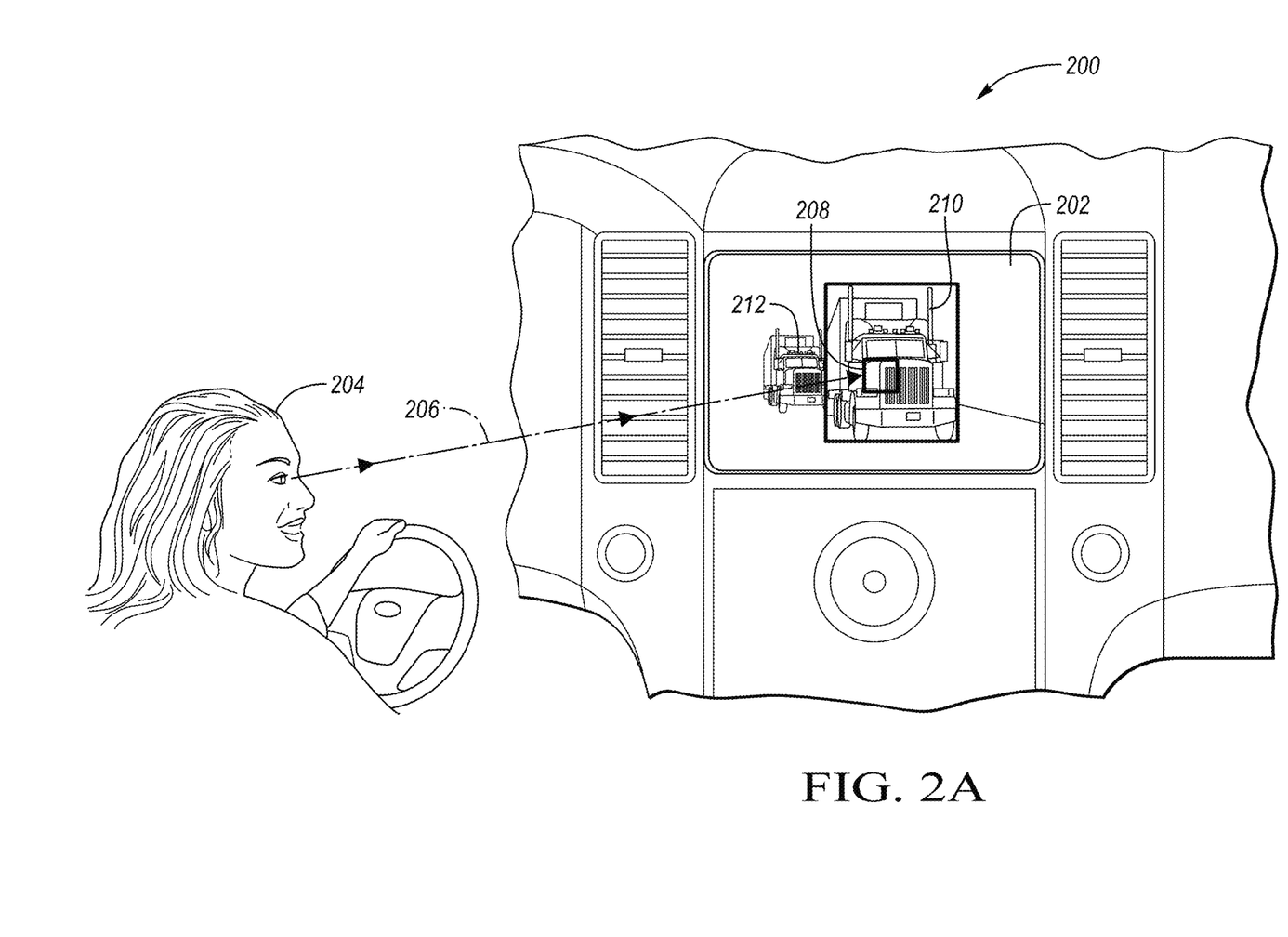
FIGS. 2A-2C are illustrations of a vehicle display and sensing system detecting an eye gaze of a driver of the vehicle at an image on the display.

FIG. 2A is an illustration of a vehicle interior 200 including a display 202 and sensing system detecting an eye gaze 206 of a driver 204 of the vehicle at an image on the display. Here the display illustrates a field of view in a vicinity of the vehicle such as a view from the front of the vehicle, the back of the vehicle or a side of the vehicle. A truck 210 is in the field of view. The field of view, however, may include any object such as a pedestrian, road sign, vehicle or object. The eye gaze 206 of the driver is directed at a desired focal point 208 of the image. The eye gaze 206 of the driver is defined as a look at a fixed point for a predetermined period of time. A fixed look is when eyes of the driver are pointed in a direction without movement. Detection of movement of the eyes may compensate for nystagmus as this may be a congenital disorder or may be induced by intoxicants such as alcohol. The detection may use vehicle interior systems such as a driver facing camera or multiple driver facing cameras. There are multiple ways to detect eye gaze, the camera or cameras may use any other of these ways including eye glint measurement, pupil/iris orientation and direction. The predetermined time period may be a fixed such as 1 second, or may be a variable time period in which the time period changes based on conditions such as vehicle speed, operation of window wipers, or signals from other vehicle modules including pedestrian detection systems, collision detection systems, adaptive cruise control systems, or other dynamic vehicle systems. The desired focal point 208 of the image has an associated object proximate to the vehicle. For example, in this illustration, the desired focal point 208 is shown to be the image of a truck 210. If the camera that captured this image is a side view camera, the desired focal point 208 may be associated with the tractor trailer located to the side of the vehicle.

Figure 2B:
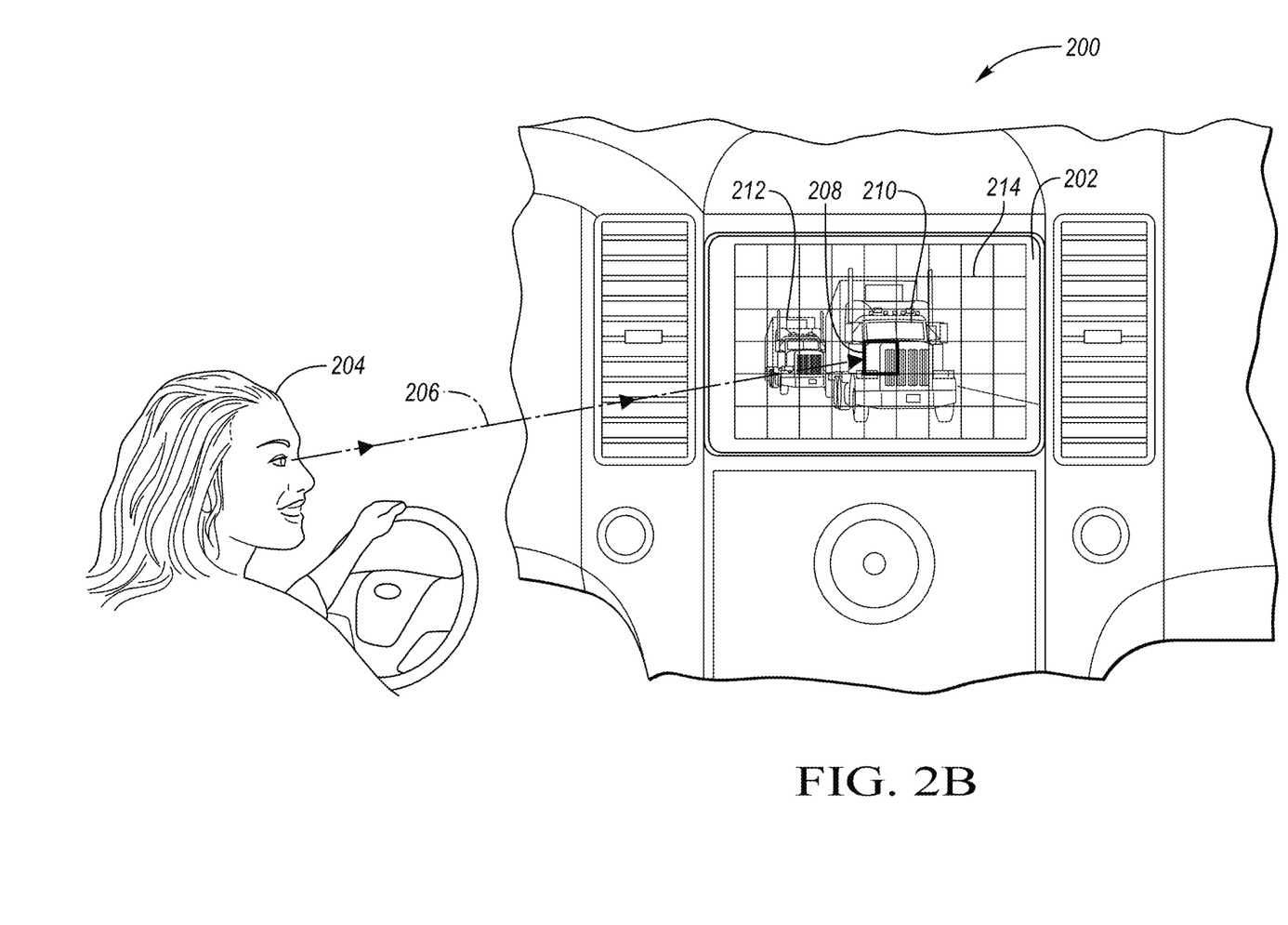

FIG. 2B is an illustration of the vehicle interior 200 including the display 202 and sensing system detecting the eye gaze 206 of the driver 204 of the vehicle at the image on the display in which the image is divided into sections by a grid 214. A processing device or controller may be used identify the truck 210 that is at the desired focal point 208 of the image on the display 202. The processing device or controller may distinguish that truck 210 from a tractor trailer 212 in the field of view. Upon detection of the truck 210 shown here as a tractor trailer, a processor or controller may utilize image processing techniques to determine a distance from the vehicle to the truck 210. The distance from the vehicle to the truck 210 may also be calculated by other sensors or modules in the vehicle using distance measuring techniques including Radio Detection and Ranging (RADAR), Sound Navigation And Ranging, Light Detection And Ranging (LIDAR) and vision. Once the distance is determined, the depth of field may be reduced to blur other objects such as the tractor trailer 212 in the image thereby accentuating the truck 210. Once a desired focal object is determined such as the truck 210, a trajectory of the truck including a direction and speed of the truck 210 may be determined. In the event that a collision is detected, an alert signal may be sent to other modules including the vehicle instrument cluster, the ABS module, or the infotainment system.

Figure 2C:
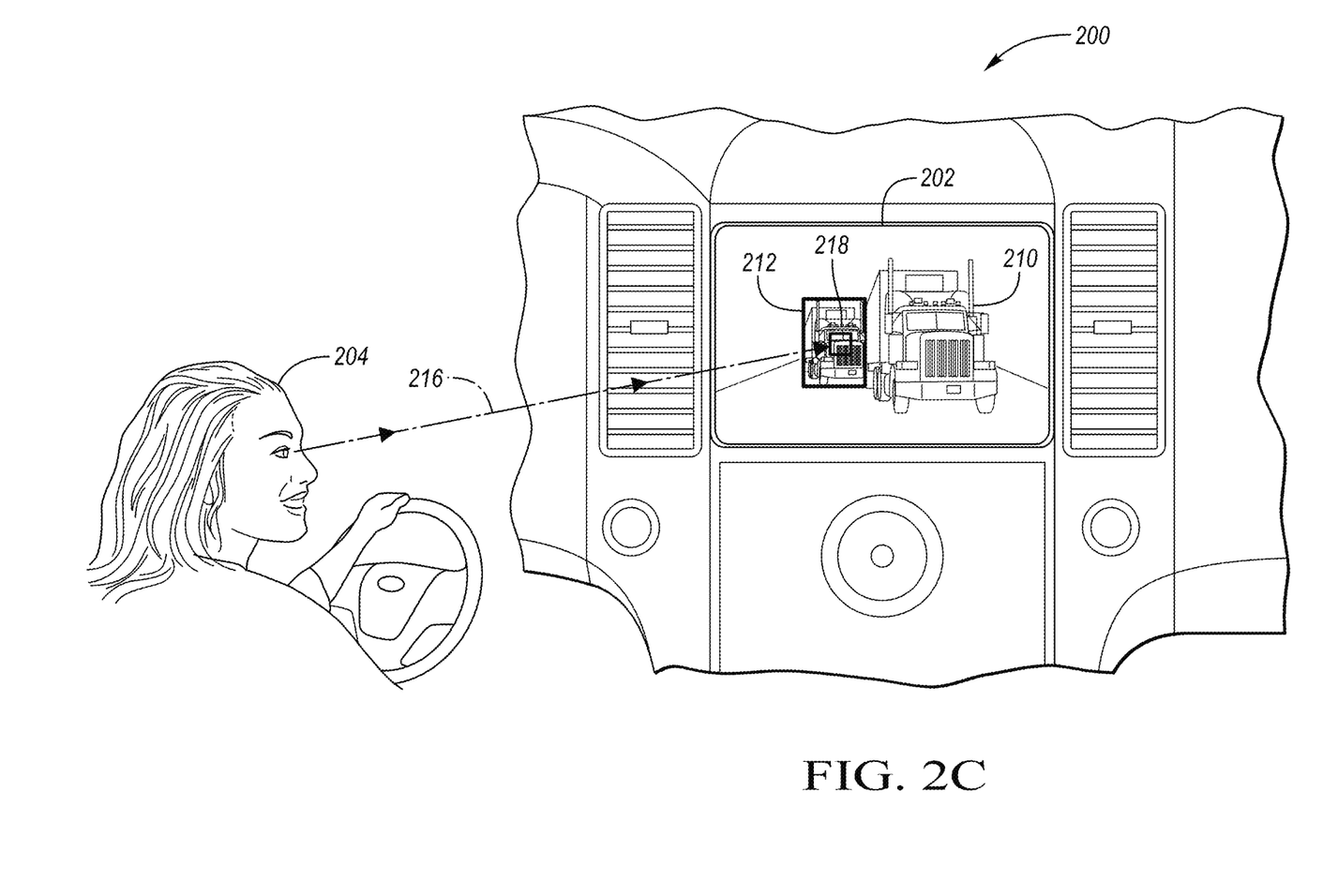

FIG. 2C is an illustration of the vehicle interior 200 including the display 202 and sensing system detecting the eye gaze 216 of the driver 204 of the vehicle at the image. Here, the driver 204 has shifted her eye gaze 216 from the truck 210 nearest to the vehicle to the tractor trailer 212 that is farther away from the vehicle. Upon detection of the truck 210, a processor or controller may utilize image processing techniques to determine a distance from the vehicle to the truck 210. The distance from the vehicle to the tractor trailer 212 may be calculated by sensors or modules in the vehicle using distance measuring techniques. Once the distance is determined, the reduction of the depth of field to a small distance away from the tractor trailer 212 at the focal point may occur to blur other objects such as the truck 210 in the image thereby accentuating the tractor trailer 212.

Figure 3:
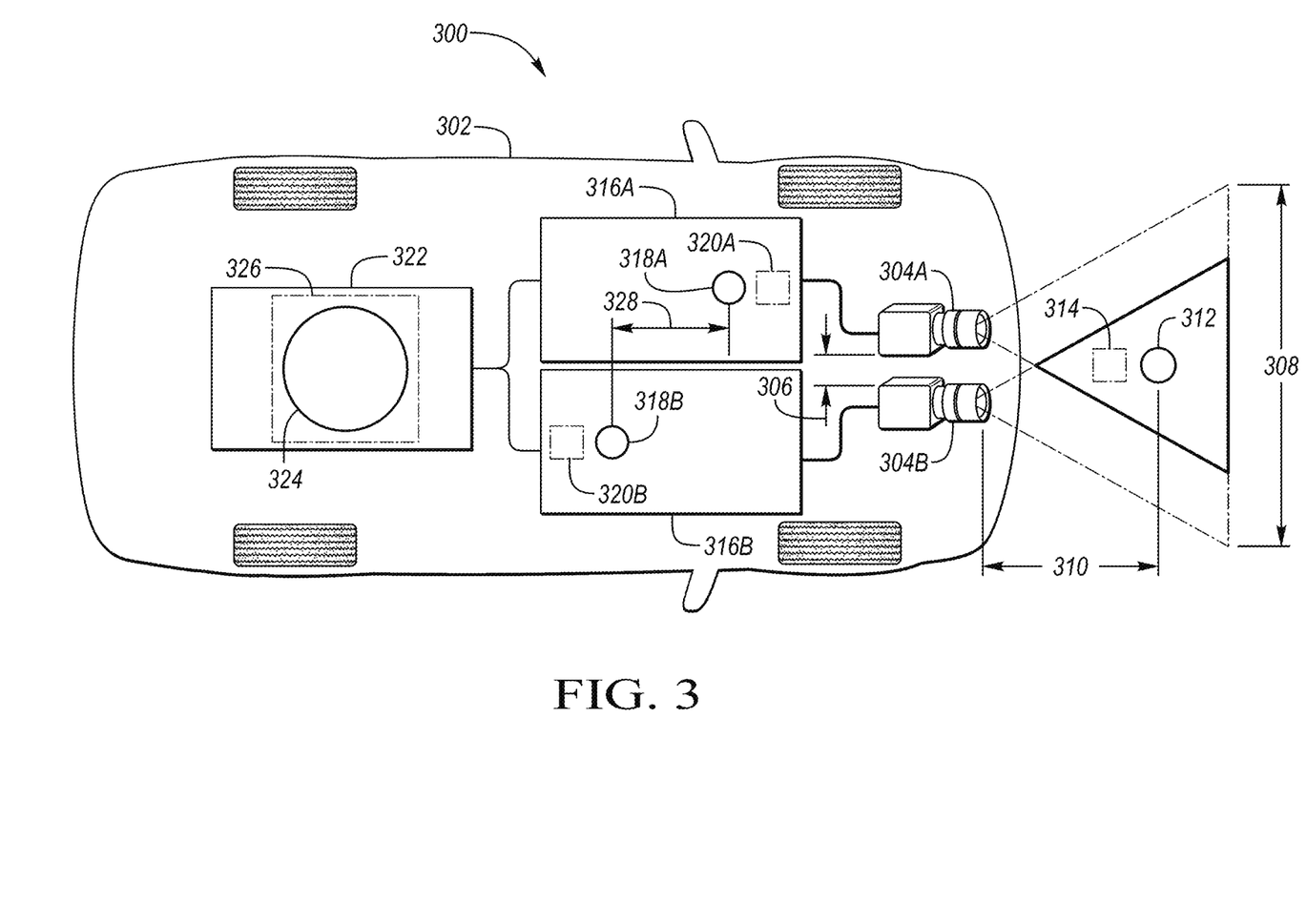
FIG. 3 is an illustration of a vehicle including a stereoscopic vision system configured to produce a blended image.

FIG. 3 is an illustration of a stereoscopic vision system 300 of a vehicle 302 configured to produce a blended image 322. The stereoscopic vision system 300 includes two cameras 304A and 304B that are a predetermined distance 306 apart. The cameras 304 capture an image of a field of view 308. In the field of view 308 at a distance 310 from the cameras 304 is a desired object 312 that has been identified by a gaze of a driver as the desired focal point of the image. A secondary object 314 also within the field of view but not within the desired focal point is shown. As camera 304A is a distance 306 away from camera 304B, camera 304A captures an image 316A that is different from the image 316B captured from 304B. As shown, the image 316A has a representation 318A of object 312 and a secondary representation 320A of the secondary object 314. Likewise, the image 316B has a representation 318B of object 312 and a secondary representation 320B of the secondary object 314. With two distinct images 316A and 316B, the desired object 312 has two representations 318A and 318B in the distinct images 316A and 316B. A processing device or controller may make a comparison of the two images 316A and 316B and the location of the representations 318A and 318B. Based on the locations of the representations 318 in the images 316, a parallax distance 328 between the representations 318 is computed. This parallax distance 328 is a function of the parallax angle. Parallax is a difference in the apparent position of an object viewed along two different lines of sight. Parallax is measured by the parallax angle between the two different lines of sight. As the distance 306 between the cameras is fixed, by measuring the parallax distance 328 between the focal representation 318A and 318B, a distance 310 from the cameras 304 to the desired object 312 can be determined by a controller or processing device. Based on the distance 310, images 316 may be blended or combined to create a single combined image 322. The combined image 322 may include a desired object depiction 324 and a secondary object depiction 326. The images 316A, 316B, and 322 may be analog or digital images, and the images may be lossless such as a raw or bitmap, or lossy such as a compressed image. The desired object depiction 324 being located within a depth of field will appear clearly while the secondary object depiction 326 being outside of the depth of field will be a blurred image. An artifact of blurring the image is that the objects that are blurred have the effect of being semi-transparent. This can be amplified with the use of image processing which can be used to enhance the desired object representation 324 and minimize the secondary object representation 326. Along with using parallax to change the depth of field, the stereoscopic vision system may also adjust an aperture in each camera 304 to change the depth of field.

Figure 4A:
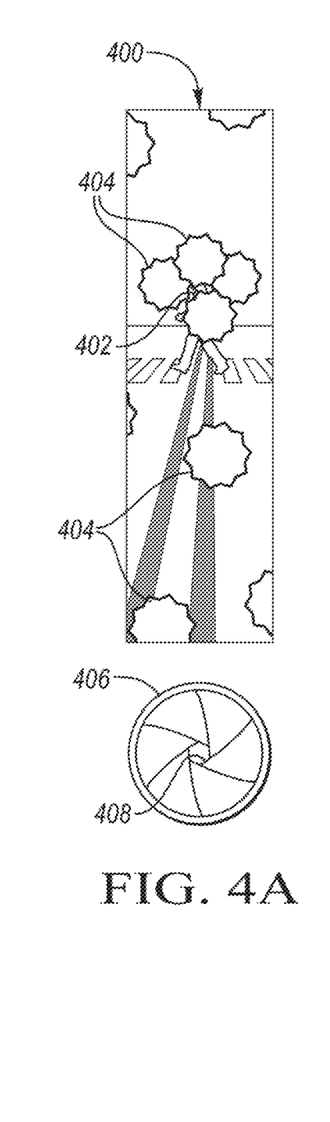
FIGS. 4A-4D are illustrations of effect of depth of field on images by adjusting an aperture of a camera.

FIG. 4A is an illustration of a camera lens 406 having an aperture 408 at an F16 setting and a pedestrian's representation 402 is captured as a pedestrian walks across a street during a snow storm. In regards to optical systems, an f-stop also called focal ratio or relative aperture is the ratio of a focal length of a lens to a diameter of an entrance pupil of the lens. The entrance pupil may be integrated with the lens or may be a separate apparatus coupled with the lens. Traditionally, the higher the f-stop such as F16, the smaller the entrance pupil and the lower the f-stop such as F1.5, the larger the entrance pupil. When the aperture is at an F16 setting as shown, the depth of field is large and many objects in the field of view are displayed clearly. Here, the pedestrian's representation 402 is in focus, however, so is the snow representation 404. The resulting image 400 illustrates that the snow being in focus obscures the desired focal point of the image, namely the pedestrian.

Figure 4B:
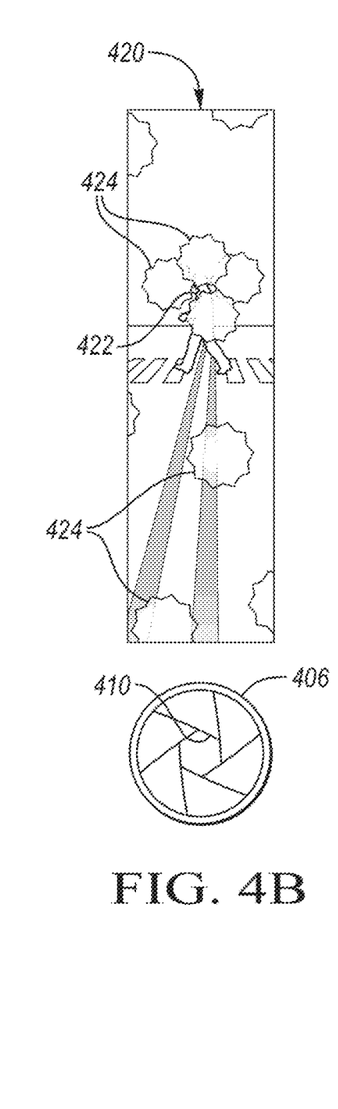

FIG. 4B is an illustration of a camera lens 406 having an aperture 410 at an F7.5 setting and a pedestrian's representation 402 is captured as a pedestrian walks across a street during a snow storm. When the aperture is at an F7.5 setting as shown, the depth of field is reduced but still generally large such that many objects in the field of view are displayed clearly. Here, the pedestrian's representation 402 is in focus, however, so is a substantial amount of the snow representation 404. The resulting image 420 illustrates that the snow being in focus obscures the pedestrian.

Figure 4C:
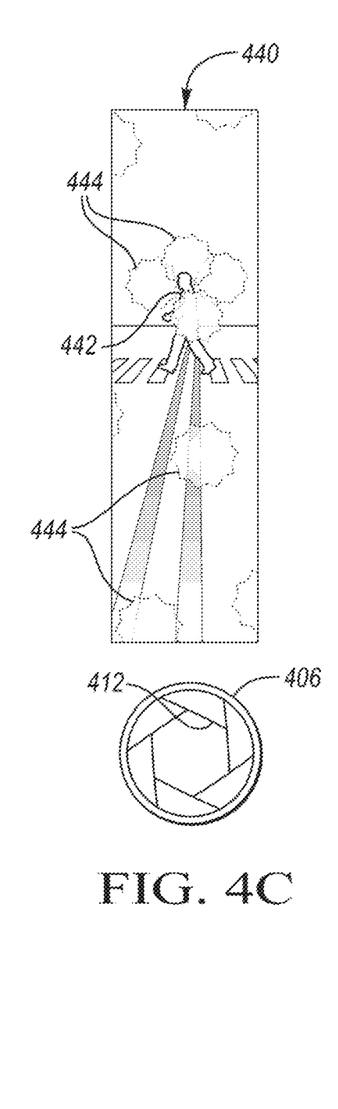

FIG. 4C is an illustration of a camera lens 406 having an aperture 412 at an F2.5 setting and a pedestrian's representation 402 is captured as a pedestrian walks across a street during a snow storm. When the aperture is at an F2.5 setting as shown, the depth of field is reduced further such that many objects in the field of view are deemphasized making the pedestrian's representation 402 appear more clearly. Here, the pedestrian's representation 402 is in focus and only a small amount of snow representation 404. The resulting image 440 illustrates that the pedestrian is in focus and appears to be enhanced while the snow that is out of focus is softened.

Figure 4D:
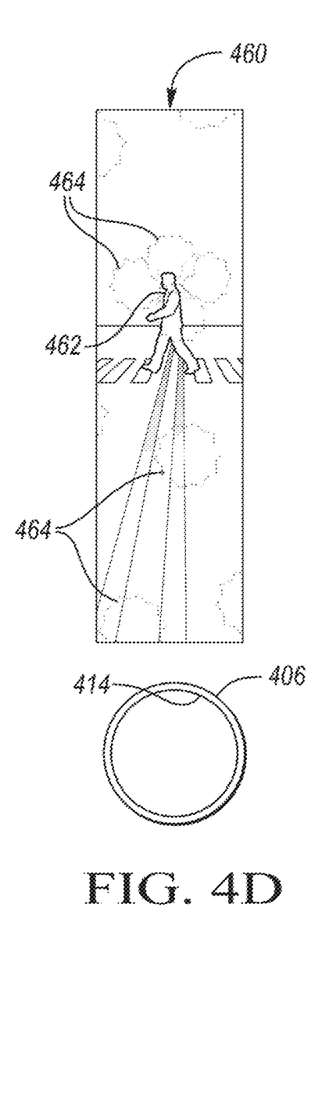

FIG. 4D is an illustration of a camera lens 406 having an aperture 414 at an F1.5 setting and a pedestrian's representation 402 is captured as a pedestrian walks across a street during a snow storm. When the aperture is at an F1.5 setting as shown, the depth of field is large and many objects in the field of view are blurred. Here, the pedestrian's representation 402 is in focus however and the majority of the snow is blurred. The resulting image 460 illustrates that the pedestrian is in focus and pops out as the center of the image and the snow, a majority of which is out of focus, appears to fade away.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   an interface configured to display an image of objects in a vicinity of the vehicle; and
   at least one controller programmed to
      in response to a driver eye gaze away from the image, maximize a depth of field of the image, and
      in response to the driver eye gaze being directed at a particular portion of the image for a predetermined period of time, identify a focal point corresponding with a physical location represented by the image at the particular portion, determine a distance between the vehicle and the physical location, and decrease the depth of field of the particular portion of the image based on the distance.

2. The vehicle of claim 1, wherein the at least one controller is further programmed to decrease the depth of field by adjusting a size of an aperture of a camera used to capture the image.

3. The vehicle of claim 1, wherein the at least one controller is further programmed to decrease the depth of field by adjusting a parallax used to blend images of at least two cameras used to capture the image.

4. The vehicle of claim 3, wherein the at least one controller is further programmed to adjust a size of an aperture of each of the at least two cameras used to capture the image.

5. The vehicle of claim 1, wherein the at least one controller is further programmed to identify pedestrians in the vicinity, and in response to identification of a pedestrian in the vicinity intersecting a current travel path of the vehicle, output an alert signal.

6. The vehicle of claim 1, wherein the at least one controller is further programmed to identify an other vehicle in the vicinity and a target trajectory of the other vehicle, and in response to the target trajectory intersecting a current travel path of the vehicle, output an alert signal.

7. The vehicle of claim 1, wherein the interface is an instrument cluster, an infotainment system, or a heads up display.

8. A method of enhancing a digital image in a vehicle comprising:
- identifying a focal point on a display screen corresponding with a gaze of a driver at an image;
- determining a distance between the vehicle and a physical location of an object represented by the image at the focal point;
- altering a depth of field corresponding with the image based on the distance to blur other objects in the image away from the focal point, and
- in response to the gaze of the driver being away from the image, maximizing a depth of field of the image.

9. The method of claim 8, wherein altering the depth of field includes adjusting a size of an aperture of a camera used to capture the image.

10. The method of claim 8, wherein altering the depth of field includes adjusting a parallax used to blend images of at least two cameras used to capture the image.

11. The method of claim 10, wherein altering the depth of field includes adjusting a size of an aperture of each of the at least two cameras used to capture the image.

12. The method of claim 8, further comprising outputting an alert based on a classification of an object at the focal point as a pedestrian.

* * * * *